T. SLOPER.
WIND SHIELD.
APPLICATION FILED AUG. 18, 1914.
1,167,124.
Patented Jan. 4, 1916.
3 SHEETS—SHEET 1.
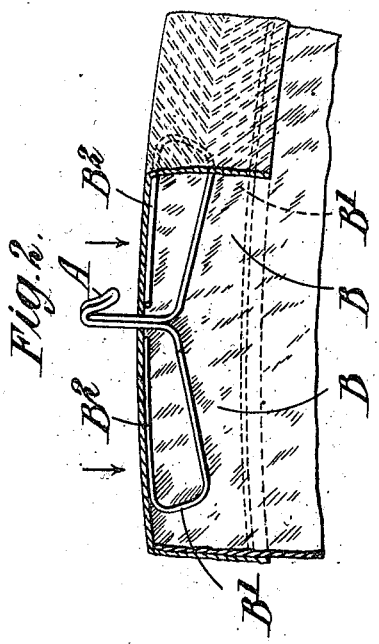
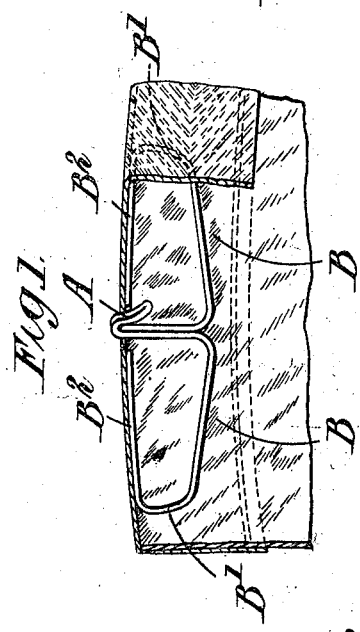

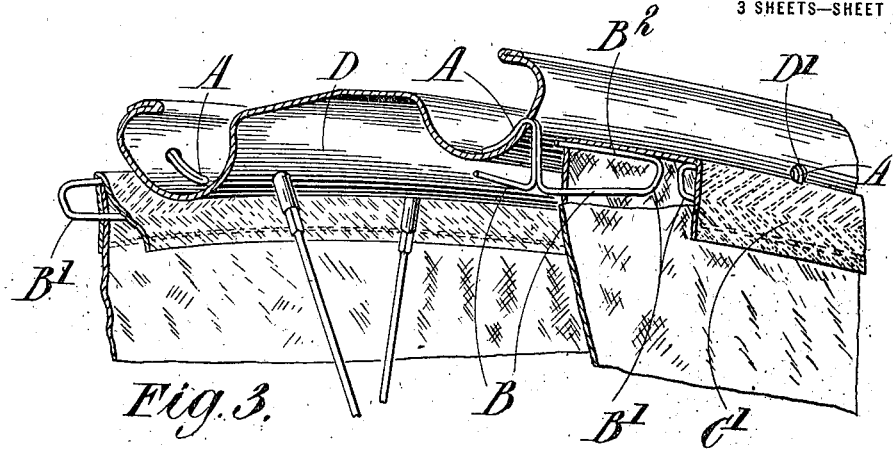
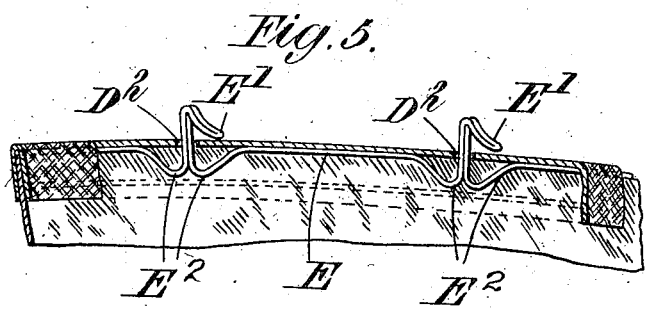
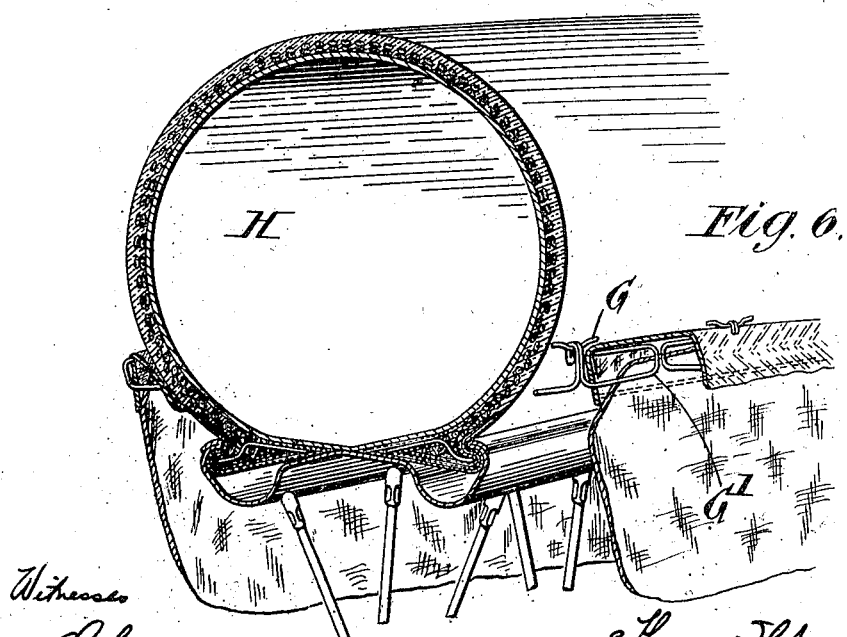

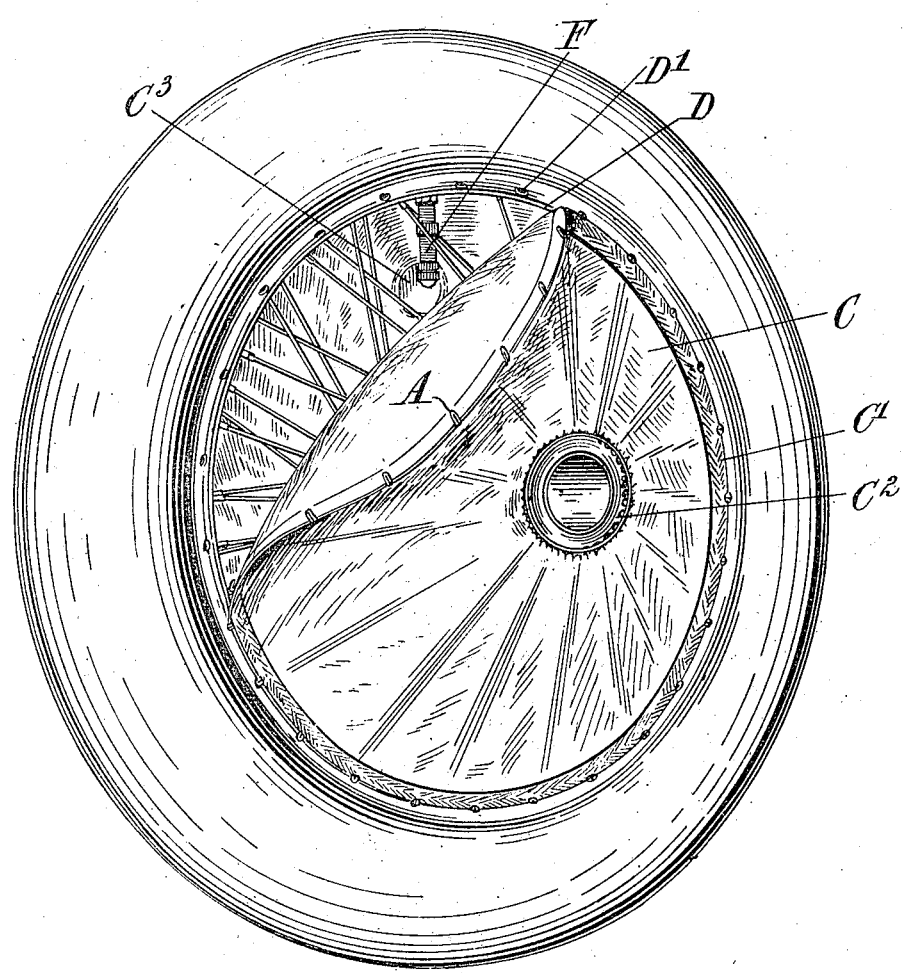

UNITED STATES PATENT OFFICE.

THOMAS SLOPER, OF DEVIZES, ENGLAND.

WIND-SHIELD.

1,167,124.
Specification of Letters Patent.
Patented Jan. 4, 1916.

Application filed August 18, 1914. Serial No. 857,353.

*To all whom it may concern:*

Be it known that I, THOMAS SLOPER, a subject of the King of England, residing at Devizes, in Wiltshire, England, have invented certain new and useful Improvements in Wind-Shields, of which the following is a specification.

As is well-known, it is desirable to cover all parts of an aeroplane which offer air resistance, with wind-shields where practicable for the purpose of decreasing the resistance. Aeroplane wheels with wire spokes are light and have considerable strength, but the spokes offer a good deal of air resistance and it is proposed to overcome this objection with reference to wheels either for aeroplanes or fast-moving road vehicles, by means of the present invention.

According to this invention therefore, a wind-shield is provided for such a wheel, which shield is composed of flexible material shaped to cover the side of the wheel, but whose diameter is not so great as that of the wheel and tire combined, and fastening means are secured to the periphery of the shield and shaped to engage the same with the wheel-element. Such a wind-shield is light, and the fastening means employed may be of such character as to enable it to be quickly attached, for the purpose of inspecting any parts behind it. The fastening means may connect the shield either direct to the rim of the wheel, or to the tire. Preferably the fastening means are resiliently controlled, for example they may be hooks arranged around the periphery of the shield and connected thereto by resilient portions so that they can be strained outward to engage the rim of the tire and will then stretch the cover neatly over the spoke portion of the wheel.

In the accompanying drawings:—Figure 1 is a face view of a resilient fastening according to one feature of the present invention; the fastening is shown in position in a piece of fabric broken away for the sake of clearness; Fig. 2 is a face view of the fastening illustrated in Fig. 1, showing the position taken by the parts when the fastening is in use; Fig. 3 is a perspective view of part of a wheel-rim showing parts of side-covers attached thereto according to the present invention, the side-covers being in part section for the sake of clearness; Fig. 4 is a perspective view of a wheel with a side-cover attached according to the present invention, part of the cover being left unfastened for the sake of clearness; Fig. 5 is a face view of part of a modified form of resilient fastening according to the present invention applied to a piece of fabric, which is broken away for the sake of clearness; and Fig. 6 is a perspective view of a portion of a tire and rim showing the side-cover attached to the tire instead of to the rim.

The same letters indicate the same parts throughout the drawings.

The fastening shown in Fig. 1 is made of resilient wire, such as steel, which is bent at the middle of its length close back upon itself to form a hook A which is constituted by both limbs of the bent wire. From this hook the two limbs are bent outward in opposite directions as at B and then forward in the direction of the hook, as shown at $B^1$. The parts $B^1$ lie almost parallel with the stem of the hook A, and beyond these the limbs are bent in toward the hook to constitute lateral arms $B^2$ therefor. It will be seen that if this fastening is secured at the edge of any fabric so that the arms $B^2$ engage the fabric to take the pull when the fabric is stretched, and the hook A interlocked with some support, the resilient parts B, $B^1$ act as springs unhampered by any direct engagement with the fabric, so that the hook can be pulled out a greater or less distance relatively to the point at which the fastenings engage with the fabric, and thus constitutes a yielding fastening. The arms $B^2$ which take the direct pull of the fabric are not connected to the same by the ends which are nearest to the hook, but by those ends which are farthest from the same. It will be appreciated that for the purpose of engaging the hook with the fabric, the arms $B^2$ could be connected to the hook by those ends which lie nearest the same, but if these connecting portions were to lie in line with the arms $B^2$, the arms would have little resilience and there would be a tendency to pull the hook through the hole in the canvas. It would be possible, however, to connect the arms to the hook by the ends lying nearest to it if they were bent inward toward the base of the stem of the hook, but the construction shown in Figs. 1, 2, and 3 is preferred, where the connecting portions B, B¹, not only do not lie in line with the arms B² but connect the hook to the arms B² at those ends remote from the hook.

In Fig. 2 the direction of thrust upon the arms B² is indicated by the arrows, and the resulting deformation of the hook is approximately shown; the deformation of course will vary according to the degree of tension it is desired to put upon the canvas or other material which the fastening is used to hold in place and hold under tension.

Conveniently the fastenings are carried in a pocket in the canvas or other material constituting the cover. This is shown in Figs. 3 and 4 where the cover C constitutes a canvas disk provided at its edge with a folded binding C¹. This binding constitutes an annular pocket in which the fastenings can lie side by side with the arms B² against the outer edge of the pocket so that they take the thrust exerted by the pull of the canvas upon them. The pocket is provided with a series of openings through which the hooks A extend.

The rim D of the wheel, which in the illustrations is intended to be an aeroplane wheel, is provided with a series of orifices D¹ on each side, which the ends of the hooks enter to engage the rim. By properly choosing the dimensions of the fabric disk C, it will be seen that each hook can be pulled forward against the action of its resilient arms until it is engaged with the rim, and thus the cover is stretched in all directions and efficiently held in place. It will be seen that the arms B² merely constitute engaging-pieces for the fabric, the resilience being obtained by the connecting parts B, B¹.

It will be appreciated that as the arms B² and the parts B and B¹ of the fastening all lie in the same plane, they fit comfortably into the peripheral pocket of the fabric, and by placing them side by side close together they constitute a stiffening for the edge of the fabric. The arms B² of each fastening may be bent to the shape of that portion of the edge of the fabric against which it is to bear.

In Fig. 5 a modified form of resilient fastening applicable to disks of fabric is illustrated. In a pocket provided in the edge of the disk, an endless wire E having in it a series of bends E² is mounted, and it is further bent at intervals conveniently between two of the bends E² to form a series of hooks E¹, each of which projects through a hole D² in the edge of the fabric. The endless wire is made a little smaller than the size required to enable the hooks to be engaged with the wheel-rim, or other support to which the fabric is to be attached and thus the whole wire has to be stretched to enable the fastenings to be engaged with the support. The bends E² give the wire the requisite resilience.

Where an endless wire is used, various means may be employed to give it the requisite resilience, for instance, it may be made of such diameter that it is nearly big enough to enable the hooks to be all engaged with the support, so that as they are brought into engagement the wire must be sprung out of the circular form, each portion lying between any two engaging hooks being brought into an approximately straight line after the manner of a cord bridging the segment of a circle, to the ends of which segment the hooks are attached. Where a corrugated or other wire ring is employed, this need not be endless as in some cases it could be divided into segments of convenient length, its action then being much the same, although it is more convenient to have it endless, that is to say, all made in one piece and the ends joined by any convenient means, or made in several pieces joined together by any convenient means.

For covering the wheels, the fabric disk is conveniently provided with a central opening C², and one of the disks may have a further opening C³ to allow access to the valve E. If it is desired to get the covers in place after the wheel is on its axle, the cover on the inner side of the wheel may be divided or partially divided, means being provided to connect the divided portions together after it is in place so that the whole can be strained as one piece.

Obviously instead of a hook for connecting the fastening to the support an eye could be employed, and in such case the support would necessarily be provided with projections wherewith such eyes could engage.

The invention is not restricted to covers or wind-shields for wheels as the fastenings can be used for stretching and securing a fabric on any support whether for the purpose of a wind-shield or for other purposes, and the application of the invention to covers for wheels is applicable to motor vehicle wheels as well as to wheels for aeroplanes.

The fastenings may be variously modified without departing from the spirit of the invention, the particular forms described and illustrated being given only by way of example and not of limitation. Further, it is evident that the situation of the parts of the fastenings shown in the drawings may be reversed, that is to say, those parts which are carried by the fabric could be carried by the rim or other support provided this were shaped suitably, or a suitably shaped part were secured thereto to receive the fastening elements; again, the engaging-piece in each case need not be directly connected to the part wherewith it is to interlock whether this is the support or the fabric as either of these elements may be provided with separate devices attached thereto to receive the engaging-piece, such for example as eyes to receive the hooks.

Obviously any of the constructions of fastening described above can be used to attach the shield direct to the tire instead of to the rim, as shown in Fig. 6, where wire eyes G are secured by any convenient means in the tire H and the wire fastenings $G^1$ engage these eyes instead of holes in the rim. It will be observed that the return portion of each arm of the fastenings $G^1$ lies rather more parallel to the out-going portion than is the case with the fastenings shown in Figs. 1–3 and this form is in some cases preferred.

What I claim as my invention and desire to secure by Letters Patent is:—

1. In a wind shield for a wheel, the combination of a shield of flexible material shaped to cover the side of the wheel and of a diameter less than the combined diameter of the wheel and tire, said shield having fastening means around its periphery, yieldingly controlled to move inward in a radial direction, but which are forced outward against the yielding control, to operatively engage the periphery of the shield with an element of the wheel, whereby the shield is stretched over the wheel, substantially as described.

2. The combination with a wheel having a series of perforations in the rim, of a wind shield of flexible material shaped to cover the side of the wheel but of a diameter less than the combined diameter of the wheel and its tire, the shield having fastening hooks secured around its periphery and yieldingly controlled to move inward toward the center of the shield, the said hooks being shaped to engage perforations in the rim when they are forced outward against their yielding control, substantially as described.

3. A wind shield for a wheel, comprising a shield of flexible material shaped to cover the side of the wheel but of a diameter less than that of the wheel and tire combined, the shield having a wire secured around its peripheral portion, and said wire having thereon a plurality of outwardly directed hooks, the wire being bent to put tension on the hooks and thus tend to draw them radially inward after they have been operatively engaged with an element of the wheel, substantially as described.

In testimony whereof I have signed my name to this specification in the presence of two subscribing witnesses.

THOMAS SLOPER.

Witnesses:
I. J. OSMAN,
WALTER J. SKERTEN.